United States Patent [19]

Majima et al.

[11] 4,036,753

[45] July 19, 1977

[54] PYROLYSIS PROCESS FOR TREATING SEWAGE SLUDGE CONTAINING CHROMIUM

[75] Inventors: Tsuyoshi Majima, Toyokawa; Katsunosuke Hara, Kariya, both of Japan

[73] Assignee: NGK Insulators, Ltd., Nagoya, Japan

[21] Appl. No.: 703,011

[22] Filed: July 6, 1976

[30] Foreign Application Priority Data

July 18, 1975 Japan .................................. 50-87896

[51] Int. Cl.² .............................................. C02C 3/00
[52] U.S. Cl. .................................... 210/63 R; 210/71
[58] Field of Search .................... 201/25, 41; 110/8 R; 210/10, 50, 63 R, 67, 71

[56] References Cited

U.S. PATENT DOCUMENTS

| | | | |
|---|---|---|---|
| 3,507,788 | 4/1970 | Cole et al. | 210/63 R |
| 3,549,010 | 12/1970 | Marsh et al. | 210/71 |
| 3,652,405 | 3/1972 | Hess et al. | 210/10 |
| 3,714,038 | 1/1973 | Marsh | 210/71 |
| 3,887,401 | 6/1975 | Nickerson et al. | 210/71 |

*Primary Examiner*—Thomas G. Wyse
*Attorney, Agent, or Firm*—Stevens, Davis, Miller & Mosher

[57] ABSTRACT

A pyrolysis process for treating sewage sludge containing chromium by burning combustible gas produced by thermal decomposition of the sewage sludge in a pyrolysis furnace by supplying oxygen of less than the theoretical amount necessary for burning the sewage sludge and keeping a partial pressure of oxygen in the furnace substantially at zero reduces the amount of hexavalent chromium remaining in the pyrolyzed residue to a harmless degree, and does not pollute the environment, has a large treating capacity, and is small in the necessary amount of fuel.

3 Claims, 1 Drawing Figure

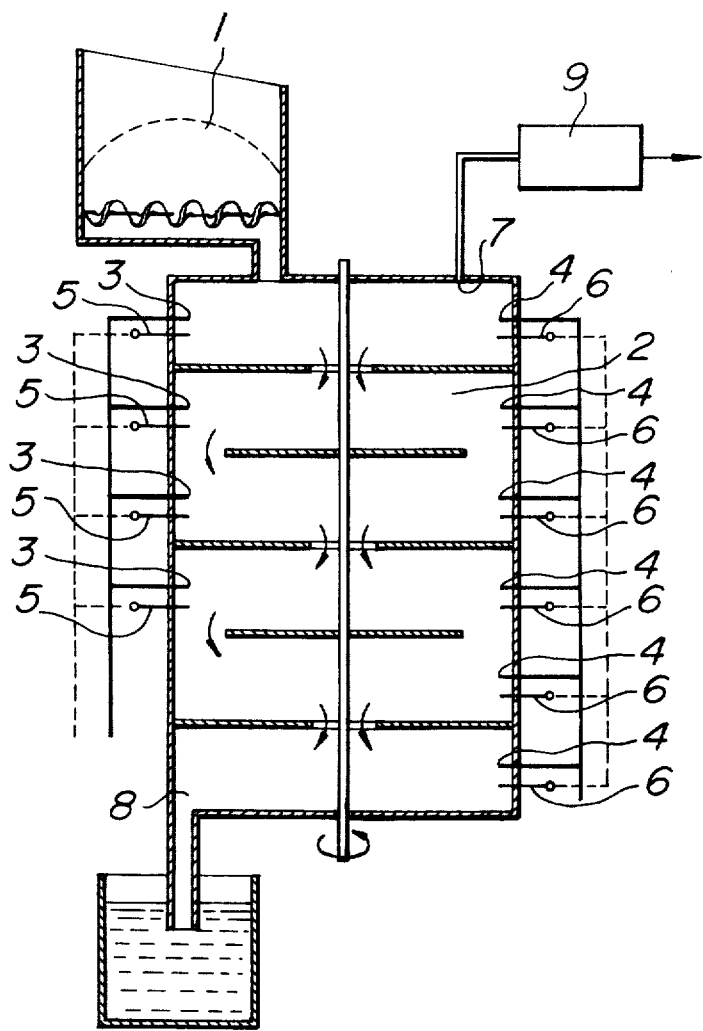

PYROLYSIS PROCESS FOR TREATING SEWAGE SLUDGE CONTAINING CHROMIUM

BACKGROUND OF THE INVENTION

1. Field of the Invention

The present invention relates to a pyrolysis process for treating sewage sludge, more particularly a pyrolysis process for sewage sludge which reduces the formation of harmful hexavalent chromium even if the sewage contains chromium.

2. Description of the Prior Art

The sewage sludge formed by treating sewage is generally dehydrated by adding a dehydrating agent, such as ferric chloride or calcium hydroxide and then incinerated at a temperature of 800°–900° C under an oxidizing atmosphere and finally discharged as an incinerated ash for reclamation. However, when the sewage sludge contains chromium, trivalent chromium in the sludge is oxidized into harmful water soluble hexavalent chromium in the course of incinerating, so that if such an incinerated ash is discharged from reclamation, the harmful hexavalent chromium in the incinerated ash is released into underground water, rivers and the like by rain water, which constitutes a risk of environmental pollution. Therefore, in the incinerated ash containing hexavalent chromium, a post-treatment for preventing harm of hexavalent chromium is necessary. For this purpose, the incinerated ash is solidified into concrete by using cement, the hexavalent chromium in the incinerated ash is reduced by adding a reducing agent or the incinerated ash is fused and solidified at a high temperature of 1,300°–1,500° C, but such processes are complicated in the treating step and there is fear that secondary pollution is caused and furthermore these processes become commercially expensive.

An internal heating type or an external heating type of pyrolysis process, in which thermally decomposed gas of sewage sludge is not burned in a pyrolysis furnace, has been recently proposed. In these pyrolysis processes, the formation of hexavalent chromium can be reduced but the sewage sludge is treated only by the thermal decomposition, so that the treating capacity per unit time is small and a large amount of fuel for generating hot gas is needed and further tar contained in the exhaust gas discharged from the pyrolysis furnace deposits on pipes and instruments and trouble often occurs in view of the operation.

SUMMARY OF THE INVENTION

A main object of the present invention is to improve a pyrolysis process for treating sewage sludge containing chromium and to prevent environmental pollution.

Another object of the present invention is to provide a pyrolysis process for treating sewage sludge, by which the formation of hexavalent chromium is reduced.

A further object of the present invention is to provide a pyrolysis process for treating sewage sludge containing chromium by which the treating capacity is improved and the amount of fuel needed is decreased.

The other object of the present invention is to improve conventional incineration processes and pyrolysis processes for treating the sewage sludge containing chromium.

BRIEF DESCRIPTION OF THE DRAWING

The attached drawing is a view for explaining an embodiment of the process of the present invention.

DETAILED DESCRIPTION OF THE INVENTION

The invention will be explained in more detail with reference to the drawing. A dehydrated cake 1 of a sewage sludge containing chromium and having a water content of 65–80% or a dehydrated cake 1 in which the water content is reduced to about 10–50% by a preliminary drying, is charged from an upper portion of a vertical multi-hearth pyrolysis furnace 2.

The vertical multi-hearth pyrolysis furnace 2 is provided with a plurality of openings for supplying oxygen of less than the theoretical amount necessary for burning the sewage sludge into the furnace and a plurality of openings for supplying a hot gas containing no oxygen into the furnace. The dehydrated cake 1 fed into the vertical multi-hearth pyrolysis furnace 2 is heated to 700°–900° C by the hot gas containing no oxygen supplied from the openings 4 and pyrolyzed while descending in the furnace to form a combustible thermally decomposed gas and the formed combustible decomposed gas is burned by a slight amount of oxygen supplied from the openings 3, which is controlled by an apparatus 5 for measuring the partial pressure of oxygen in the furnace always to keep said partial pressure substantially at zero. The amount of oxygen supplied must be less than the theoretical amount necessary for burning the sewage sludge and said amount is preferred to be less than 90% of the theoretical amount, more preferably 45–75%.

The raising of the temperature in the furnace due to the partial combustion of the decomposed gas is measured by an apparatus 6 for measuring temperature in the furnace and the amount of the hot gas supplied from the openings 4 is controlled by the indication of said apparatus 6.

The dehydrated cake 1 stays for 10–50 minutes in the furnace and is completely pyrolyzed and the exhaust gas containing the combustible gas is discharged from an opening 7 provided at the top of the furnace and the pyrolyzed residue is discharged from the bottom 8 of the furnace into water and quenched therein. The exhaust gas containing the combustible gas is burned in a combustion chamber 9 and is utilized as a heat source.

Since the partial pressure of oxygen in the furnace is kept substantially in zero, oxygen supplied from the opening 3 is consumed only for the partial combustion of the thermally decomposed gas and does not diffuse into the surface and the inner portion of the sludge to be pyrolyzed, so that trivalent chromium in the sludge is not substantially oxidized into hexavalent chromium. However, when the partial pressure of oxygen in the furnace is not zero but an oxidizing atmosphere is formed, oxygen diffuses from the surface of the sludge to be pyrolyzed into the inner portion and trivalent chromium in the sludge is oxidized into hexavalent chromium and therefore the harmful hexavalent chromium remains in the pyrolyzed residue. Accordingly, in order to reduce the formation of hexavalent chromium, the partial pressure of oxygen in the furnace must be always kept substantially at zero in any portion. When the pyrolyzed residue is contacted with air at a temperature higher than 150° C, the formation of hexavalent chromium increases, so that even when the pyrolyzed residue is cooled in air, it is preferred to cool said residue under a state where oxygen is not present but, in general, it is preferred to quench said residue in water.

By controlling the amount of oxygen supplied so that the concentration of carbon monoxide in the furnace is 1–5% by volume, the partial pressure of oxygen in the furnace also can be kept substantially at zero. As the pyrolysis furnace for the present invention, use may be made of a rotary kiln, a fluidized bed furnace and pyrolysis furnaces other than the above described vertical multi-hearth pyrolysis furnace.

The following example is given for the purpose of illustration of this invention and is not intended as any limitation thereof.

EXAMPLE

Dehydrated cake 1 of sewage sludge containing 0.1% by weight of trivalent chromium was preliminarily dried to an average water content of 30% and supplied into the vertical multi-hearth pyrolysis furnace 2 as shown in the attached drawing at a feeding rate of 2,100 Kg/hr. and subjected to pyrolysis for 20 minutes in the furnace heated at 800° C by hot gas containing no oxygen obtained by burning heavy oil at air ratio of 0.95. Oxygen corresponding to 70% of the theoretical amount of oxygen necessary for burning the sewage sludge was supplied from the opening 3 to each stage to keep the partial pressure of oxygen in each hearth substantially at zero to burn the thermally decomposed gas and simultaneously to effect pyrolysis and then the pyrolyzed residue was discharged from the furnace bottom 8 into water without contacting with air to quench the pyrolyzed residue, whereby the pyrolyzed residue No. 1 according to the present invention was obtained.

For comparison, the same sewage sludge as described above was completely incinerated at 850° C in a conventional incineration process wherein the concentration of oxygen in the furnace was 10% by volume by supplying oxygen of 1.5 times the theoretical amount of oxygen necessary for incinerating the sewage sludge to the furnace, to obtain an incinerated ash No. 4.

Furthermore, the same sewage sludge as described above was treated with an internal heating type pyrolysis process under a state where oxygen is not present, at 800° C by supplying a hot gas containing no oxygen to obtain a pyrolyzed residue No. 2. Furthermore, the same sewage sludge was treated with an external heating type non-combustion pyrolysis process by using a rotary kiln type non-combustion pyrolysis furnace to obtain a pyrolyzed residue No. 3. The comparison of these treating processes is shown in the following Table 1.

Table 1

|  | No. 1 | No. 2 | No. 3 | No. 4 |
|---|---|---|---|---|
|  | Present Invention | Conventional | Conventional | Conventional |
|  | Internal heating type partial combustion pyrolysis process | Internal heating type non-combustion pyrolysis process | External heating type non-combustion pyrolysis process | Incineration process |
| Treating apparatus | Vertical 6-hearth (Total area of furnace bed) 50 m$^2$ | Vertical 6-hearth (Total area of furnace bed) 50 m$^2$ | External heating type rotary kiln (Total surface area of kiln) 50 m$^2$ | Vertical 6-hearth (Total area of furnace bed) 50 m$^2$ |
| Treating capacity (Kg dried cake/H) | 2,100 | 1,200 | 900 | 2,300 |
| Ig.Loss of the residue or the incinerated ash (%) | 5.0 | 5.1 | 5.4 | 2.5 |
| Formed amount of hexavalent chromium (mg/Kg) | 1.4 | 1.0 | 1.1 | 510 |
| Concentration of hexavalent chromium dissolved off (mg/l) | <0.1 | <0.1 | <0.1 | 18.4 |
| Trouble of deposit of tar on pipes and instruments | Substantially no | much | much | Absolutely no |
| Oil consumption (Kg/H) | 90 | 310 | 400 | 30 |

As seen from the above Table 1, the pyrolysis process of the present invention can provide a treating capacity of 2 times that of the conventional pyrolysis processes and is substantially equal to the treating capacity of the conventional incineration process. The formed amount of hexavalent chromium in the pyrolyzed residue according to the present invention is less than 1/200 of that of the conventional incineration process. The fuel amount for generating the hot gas necessary for the pyrolysis process in the present invention is less than ½ that of the conventional pyrolysis processes. The deposit and clogging of pipes due to formation of tar, which have been observed in the conventional pyrolysis processes, were not caused.

As mentioned above, the method for pyrolyzing sewage sludge according to the present invention can noticeably reduce the formation of hexavalent chromium as compared with the conventional incineration process. As compared with the conventional pyrolysis processes, the pyrolysis process of the present invention is larger in the treating capacity per unit time, although the used fuel is far smaller and the clogging of pipes and the deposit on instruments due to tar in the exhaust gas are not substantially caused. Accordingly, the pyrolysis process for treating sewage sludge according to the present invention is very useful.

What is claimed is:

1. A pyrolysis process for treating sewage sludge containing chromium, which comprises
   burning combustible gas produced by thermal decomposition of the sewage sludge in a pyrolysis furnace by supplying oxygen of less than the theoretical amount necessary for burning the sewage sludge, and
   keeping the partial pressure of oxygen in the furnace substantially at zero.

2. The process as claimed in claim 1, wherein the amount of oxygen supplied into the furnace is less than 90% of the theoretical amount of oxygen necessary for burning the sewage sludge.

3. The process as claimed in claim 2, wherein said amount of oxygen supplied is 45–75% of the theoretical amount.

* * * * *